United States Patent [19]

Frenzer et al.

[11] Patent Number: 5,396,643
[45] Date of Patent: Mar. 7, 1995

[54] GEOGRAPHIC-AREA SELECTIVE LOW-EARTH SATELLITE-BASED PAGING BROADCAST SYSTEM AND METHOD

[75] Inventors: Michael W. Frenzer, Palatine; Robert J. Locascio, Crystal Lake; Joan E. Zocher, Algonquin; Dwight D. Walthers, McHenry; Martin V. Seitz, Fox River Grove; Christopher N. Kurby, Elmhurst, all of Ill.

[73] Assignee: Motorola, Inc., Schaumburg, Ill.

[21] Appl. No.: 933,550

[22] Filed: Aug. 24, 1992

[51] Int. Cl.$^6$ ............................................. H04B 7/185
[52] U.S. Cl. .................................. 455/13.1; 455/13.2; 455/38.1; 340/825.44
[58] Field of Search ................. 455/12.1, 13.1, 13.2, 455/13.3, 13.4, 38.1, 51.2; 340/825.44

[56] References Cited

U.S. PATENT DOCUMENTS 5,010,317 4/1991 Schwendeman ............... 340/311.1
5,239,670 8/1993 Schwendeman et al. ........ 455/13.1

FOREIGN PATENT DOCUMENTS 0311919 4/1989 European Pat. Off. ......... 455/12.1
0365885 5/1990 European Pat. Off. ......... 455/13.1
9108621 6/1991 WIPO ............................ 455/12.1

Primary Examiner—Reinhard J. Eisenzopf
Assistant Examiner—Andrew Faile
Attorney, Agent, or Firm—Darleen J. Stockley

[57] ABSTRACT

The present invention includes a low-earth satellite-based paging broadcast system (100) and method (200, 300) that maximizes spectral efficiency and minimizes power expenditure for the broadcast of paging messages by broadcasting the messages to terminator- or originator-selectable portions of the total system coverage area. The terminator selects a long-term preferred geographic area (LTPGA), and optionally, a short-term preferred geographic area (STPGA). The originator provides the terminator ID, the message, and optionally provides a customized preferred geographic area (CPGA). Terminators and originators can easily modify the selectable geographic areas (SGA(s)): LTPGA(s), STPGA(s), and CPGA(s). The gateway converts the SGA(s) to addressable coverage areas (ACA(s)), and transmits a signal including the paging information, and ACA(s) to at least a first communication satellite (COM SAT). The COM SAT(s) provide for crosslinking the signal to other COM SAT(s) and for broadcasting the paging information to the ACA(s).

16 Claims, 3 Drawing Sheets

GEOGRAPHIC-AREA SELECTIVE LOW-EARTH SATELLITE-BASED PAGING BROADCAST SYSTEM AND METHOD

FIELD OF THE INVENTION

The present invention relates generally to communication paging systems, and more particularly to paging systems for selective geographic areas within low-earth satellite-based communication network systems.

BACKGROUND

Communication paging systems have traditionally broadcast pages to a system's entire coverage area. Such a system has been tolerable, though not efficient, for land-based systems. In addition, such a system does not readily allow for adjustment of selected coverage areas. However, a satellite-based paging system typically provides coverage to a larger geographical area than a land based-paging system. Thus, a satellite-based paging system typically expends a large amount of energy and/or capacity sending paging messages to areas in which a pager is not located in order to be sure that the pager receives its message. This is inefficient use of broadcasting resources.

Thus, there is a need for a more efficient paging broadcast system and method for facilitating conservation of energy and/or capacity of the system.

SUMMARY OF THE INVENTION

The present invention provides a geographic area-selective low-earth satellite-based paging broadcast system and method that utilize at least: a first origination unit for at least a first originator, a first gateway, at least a first termination unit, and a plurality of communication satellites (COMSATs) having a plurality of addressable coverage areas (ACAs). The first origination unit comprises a unit for transmitting paging information (a paging message and a termination unit identification (ID)) to a gateway for further transmission to a COM SAT, where the paging information is ultimately intended for a preselected termination unit, and wherein a signal, as transmitted by the origination unit, may include information indicating a customized preferred geographic area (CPGA). Each gateway comprises a unit for assigning a pager identification code to the termination unit and for transmitting a signal to a COM SAT, a unit for providing selection of selectable geographic area(s) (SGA(s)) and for converting the SGA(s) to at least a first addressable coverage area (ACA) such that the SGA(s) are included within the ACA(s), and a unit for transmitting said signal from the gateway to a communication satellite in accordance with the selected ACA(s). Each communication satellite (COM SAT) comprises at least: a communication relay transceiver for at least receiving the signal from the gateway and transmitting said signal in accordance with the selected ACA(s), which satellite may utilize further communication satellites in a crosslinking manner for retransmission of the signal in accordance with the selected ACA(s), until the communication satellites have completed transmitting said signal in accordance with the selected ACA(s) such that transmission of the signal to the preselected termination unit is facilitated.

DETAILED DESCRIPTION OF A PREFERRED EMBODIMENT

Figure 1:
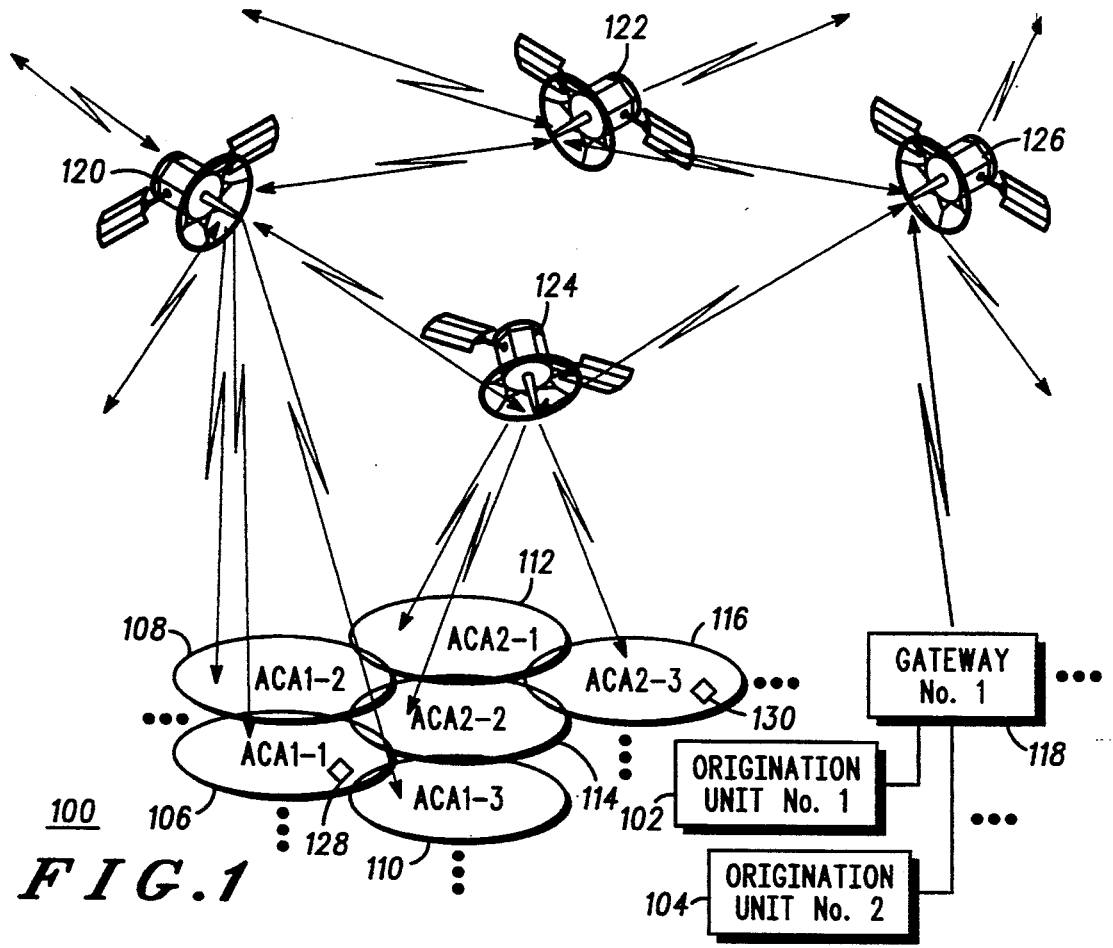
FIG. 1 illustrates a geographic area-selective low-earth satellite-based paging broadcast system in accordance with the present invention.

To facilitate conservation of energy and/or capacity of the communication paging system, the present invention employs a broadcast system and method for efficient utilization of selected areas of broadcast coverage. The terms termination unit, a radio communication paging unit (user is a terminator) and origination unit, an information entry device, (user is an originator) will be utilized to describe the present invention.

In particular, a terminator having a pager for receiving paging messages selects a long-term preferred geographic area (LTPGA) and in addition, may select a short-term preferred geographic area (STPGA). Alternatively, an originator (i.e., one sending a paging message) may select a customized preferred geographic area (CPGA) into which to broadcast paging information (the paging message and a termination unit ID). Thus, an area to which a paging message is to be broadcast is limited.

The present invention provides the advantages of allowing an originator to customize the broadcast coverage area over which the page is sent, and allows the terminator to change the broadcast areas easily (allowing at least two broadcast coverage areas). It minimizes satellite power consumption and maximizes the use of the allocated frequency band by allowing for small geographic broadcast areas.

Thus, the present invention, unlike current regional paging systems, readily allows a terminator to change his preferred geographic area. If a terminator is temporarily leaving his normally preferred geographic area, the terminator may call a gateway and provide a short-term preferred geographic area (STPGA). Thus, when a terminator embarks on temporary or unusual travel, the terminator may readily adjust his paging area. Where the terminator travels to an area where he plans to remain for an extended period of time (i.e., relocation), he informs the gateway, and the gateway updates his long-term preferred geographic area.

The provision of two preferred areas, a long-term and a short-term, minimizes the amount of information that a terminator is expected to provide the gateway upon returning from temporary or unusual travel.

When the originator contacts the gateway, typically via the public switched telephone network (PSTN), to attempt a page, he provides the ID of the termination unit. Then, he may choose to send a paging message to the area of record for the termination unit (i.e., to the short- or long-term preferred geographic area presently in effect for the termination unit) or may send a paging message to an originator customized geographic area.

Thus, if the originator chooses to send a paging message to the area of record, then the gateway determines whether a the short-term preferred geographic area has been stored for the selected termination unit in the memory unit. Where the STPGA has been stored for the selected termination unit in the memory unit, the gateway utilizes the STPGA to determine an addressable coverage area to receive the paging message. Where no STPGA has been stored for the selected termination unit, the gateway utilizes the long-term preferred geographic area that the terminator has previously provided to the gateway. Where the originator has sent previous paging messages to the termination unit, and the messages have been unanswered, or the originator has reason to believe that the terminator is located in a different location than that indicated by the short-term or long-term preferred geographical area, the originator typically selects a customized geographic area.

Once a geographical area is selected, the gateway generates a list of a minimum addressable coverage areas (ACA(s)). Each ACA may be viewed as a cell that is either fixed in position relative to a bottom (surface of the satellite facing the earth) of a communication satellite or is fixed in position on the earth.

Where the cell is viewed as fixed in position relative to the bottom of low-earth orbit satellites, the ACA moves across the surface of the earth at the speed of the satellite. In this embodiment, the selected geographic area for transmission relationship to the list of stored ACA(s) is frequently updated, e.g., every few seconds, by the gateway. In an implementation where the cells are fixed in position on the earth, for low-earth orbit satellites, for example, the rapidly moving satellites may continually modify the pointing of satellite antenna beams.

The originator provides identification (ID) of the termination unit and a paging message. The gateway may assign a message number to the message.

The gateway transmits an information signal, e.g., a packetized data signal, that includes the list of ACA(s) that include the selected geographical areas, the termination unit ID, the paging message, and, optionally, the message number. Typically, the gateway uplinks the information signal to a nearest communication satellite. Then the satellite determines whether the information signal includes any of the ACA(s) which are ACA(s) for that satellite. Where ACA(s) for the satellite are included, the satellite broadcasts the paging information, and optionally, the message number, into the specified ACA(s). Where ACA(s) also include ACA(s) for at least one other satellite, the satellite removes its ACA(s), if any, and broadcasts the signal (REM SIGNAL) containing the remaining information utilizing crosslinks. A crosslink is a communication link between satellites. Alternatively, the signal may be repacketized and transmitted using crosslinks. Repacketizing is duplicating the paging information and, optionally, the message number, dividing the ACA(s) into disjoint lists, and creating multiple crosslink packets for transmission. This sequence of events is repeated by each communication satellite until the paging information (and optionally, the message number) has been transmitted to all selected ACA(s). Clearly, crosslink routing may be modified to accommodate satellite transmission failures.

Also, clearly, the termination unit may be customized to compare a paging message number to recently received paging message numbers, and to discard paging messages having matching numbers. In addition, the termination unit includes a means to indicate a paging message to the terminator.

FIG. 1, numeral 100, illustrates a geographic area-selective low-earth satellite-based paging broadcast system in accordance with the present invention. A low-earth orbit is defined as an orbit that, while providing service, has a minimum orbital altitude that is less than an altitude of a geostationary satellite. The said system comprises at least at least a first origination unit (ORIGINATION UNIT 1, ORIGINATION UNIT 2, ...)(102, 104, ...), at least a first paging-supporting gateway (GATEWAY 1,...) (118, ...), a plurality of communication satellites (COMSATs) (120, 122, 124, 126, ...) having a plurality of addressable coverage areas (ACA1-1, ACA1-2, ACA1-3, ACA2-1, ACA2-2, ACA2-3, ...)(106, 108, 110, 112, 114, 116, ...), and at least a first termination unit (128, 130, ...). Though only two termination units (128, 130) are illustrated in FIG. 1, it is clear that a plurality of termination units that is greater than two may be served by the system. Also, although two COMSATs (120, 124) are illustrated sending pages to only three ACAs per satellite, it is clear that each COM SAT may be arranged to provide pages to a predetermined plurality of ACAs. Clearly, the size and shape of the ACA(s) are system design parameters. For example, a relatively circular area having a radius of a hundred and fifty miles is a workable ACA. The ACAs are typically arranged such that some overlap of ACAs is present, thereby providing paging coverage for the entire earth surface as is clear from FIG. 1. As the COMSATs approach polar regions of the earth and COM SAT orbits are closer together, the degree of such ACA overlap may become so large that preselected ACA(s) may be inactivated as an energy-saving measure (since other overlapping ACA(s) will provide coverage for the inactivated ACA(s)) and to prevent interference.

The first origination unit (102) is operably coupled to the first gateway (118), for providing information to the first gateway (118). For example, a first origination unit (102) may be a telephone that is connected to the first gateway by a public switched telephone network (PSTN). The information provided indicates at least selected paging information, and where selected, a CPGA, for a selected termination unit.

Each origination unit (102, 104, ...) comprises a unit for transmitting a signal to a gateway for further transmission to a COM SAT, where the signal is ultimately intended for a preselected termination unit (the paging unit to receive the page), wherein the signal, as transmitted by the origination unit, includes at least paging information and may include information indicating a customized preferred geographic area (CPGA). Typically, paging information includes a pager ID for the selected termination unit (pager) and the message being sent by the origination unit.

Each gateway (118,...) includes a unit for assigning a pager identification code to the termination unit (i.e., termination unit IDs/pager IDs). The gateway includes a unit for terminator selection of LTPGA(s), and optionally, STPGA(s). In addition, the gateway includes a unit for optional originator selection of CPGA(s). The gateway provides for memory unit storage of at least termination unit identification numbers, LTPGA(s) or corresponding ACA(s), STPGA(s) or corresponding ACA(s), and selectable paging services information for a pager. Storage is typically accomplished utilizing disk storage or optical storage. The gateway processes the selected geographic area(s) (SGA(s)) into a list of one or more addressable coverage areas (ACA(s)) such that the SGA(s) are included within the ACA(s). Any one or more CPGA(s), LTPGA(s), and STPGA(s) make up the SGA(s). The gateway provides for transmission of originator-generated paging information, ACA(s), and optionally, a paging message number, to at least a first COM SAT (120, 122, 124, 126, ...) in accordance with preselected paging services for the pager.

Each communication satellite (COM SAT) (120, 122, 124, 126, ...) comprises at least: a communication relay transceiver for at least receiving the signal from the gateway and transmitting said signal in accordance with the selected ACA(s) (ACA1-1, ACA1-2, ACA1-3, ACA2-1, ACA2-2, ACA2-3, ...) (106, 108, 110, 112, 114, 116, ...), which satellite may utilize further communication satellites in a crosslinking manner for retransmission of the signal in accordance with the selected ACA(s), a last such utilized communication satellite completing transmitting said signal in accordance with the selected ACA(s) such that transmission of the signal to the preselected termination unit is facilitated.

The long-term preferred geographic area (LTPGA) is typically provided to the first gateway (118) by a terminator at a time, for example, when the terminator obtains his termination unit (128, 130,...), typically a page-receiving device (i.e., pager). Generally, the terminator selects a LTPGA, an area where he expects to be available for paging, at a time when he rents, leases or purchases the first termination unit (128, 130, ...). The terminator, of course, may change the LTPGA by providing an updated LTPGA to the first gateway (118). In addition, the terminator may select at least a first short-term preferred geographic area (STPGA) to provide flexibility at any time by providing the STPGA to the first gateway (118). The origination unit (102, 104, ...) may be used to enter LTPGA(s) and/or STPGA(s). For example, where the terminator knows that he will be in a location different from his LTPGA for a short period of time (i.e., a STPGA), he may utilize an origination unit (102, 104, ...) to communicate the STPGA to the gateway (118).

The gateway (118) assigns a termination unit identification number (termination unit ID) to the termination unit (128), and stores the termination unit ID, typically in a table in a memory unit that is organized and arranged to provide the LTPGA or corresponding ACA(s), and, where selected, the STPGA or corresponding ACA(s), associated with the termination unit ID. Of course, the table may also include a listing of paging services predetermined by the terminator. In other words, upon acquiring a pager, the terminator may elect desired paging services such as message prioritization paging, duplicate paging recognition and elimination, and so forth. The gateway (118) assigns each selected preferred geographic area (LTPGA, STPGA, CPGA) to at least a first addressable coverage area (ACA1-1, ACA1-2, ACA1-3, ACA2-1, ACA2-2, ACA2-3, ...)(106, 108, 110, 112, 114, 116, ...), such that at least a first targeted ACA is provided for receiving transmission of the originator's paging message. The gateway (118) transmits an information signal consisting of at least the originator's paging message, a list of the selected ACA(s), the termination unit ID. In addition, where selected, the gateway (118) may also include an indication of a message number.

At least a first paging-supporting gateway (118,...) is typically provided. Twenty such gateways are a workable number of gateways, where the gateways are arranged to provide distributed coverage across a worldwide receiving area.

Each communication satellite (COM SAT) (120, 122, 124, 126, ...) typically comprises at least a communication relay transceiver for at least receiving the signal from the gateway or another COM SAT and transmitting said signal in accordance with the selected ACA(s). The COM SAT receiving the signal from the gateway may utilize further COM SAT(s) in a crosslinking manner for retransmission of the signal in accordance with the selected ACA(s). Where ACA(s) are in the COM SAT's broadcasting coverage area, the COM SAT broadcasts the paging information into those ACA(s), such that transmission of the signal by said COM SAT to the preselected termination unit (128, 130,..) is facilitated. Where the COM SAT transmits the signal in a crosslink relay fashion to ACA(s) indicated by the signal, the information identifying the ACA(s) to which the signal has already been transmitted is first removed from the signal, and, where further ACA(s) are represented in the remaining signal, the signal containing the remaining information is transmitted to other COM SAT(s) in accordance with the remaining ACA(s) contained in the signal.

The termination unit (128, 130, ...) is typically a radio communication unit such as a pager, which is operably coupled to a COM SAT by a radio communication link and includes means for indicating a paging message (such as visual display or voice).

The signal transmitted by the gateway to the COM SAT comprises a signal representing at least an ID of the preselected terminator unit, at least a first targeted addressable coverage area (ACA), and the selected paging message. The signal may, of course, be selected to include further information such as a message number.

Thus, for example, an originator may telephone a selected gateway, and, where selected, may register a CPGA. The originator provides selected paging information to be communicated to a first termination unit via a COM SAT, and where necessary, via crosslinking to further COM SAT(s), such that at least a first COM SAT transmits a signal that represents the paging information to at least a first ACA in accordance with preselected paging service for the preferred geographic area(s) selected.

In addition, the paging services may be selected to provide an indication that the paging signal has been received by the preselected terminator unit. In such a case, in response to receiving the signal from a COM SAT, the termination unit includes means for indicating the message to the terminator (such as visual display or voice) and may provide an identifiable audio tone and/or visual display or vibrators to alert the terminator that a paging signal has been received.

Figure 2:
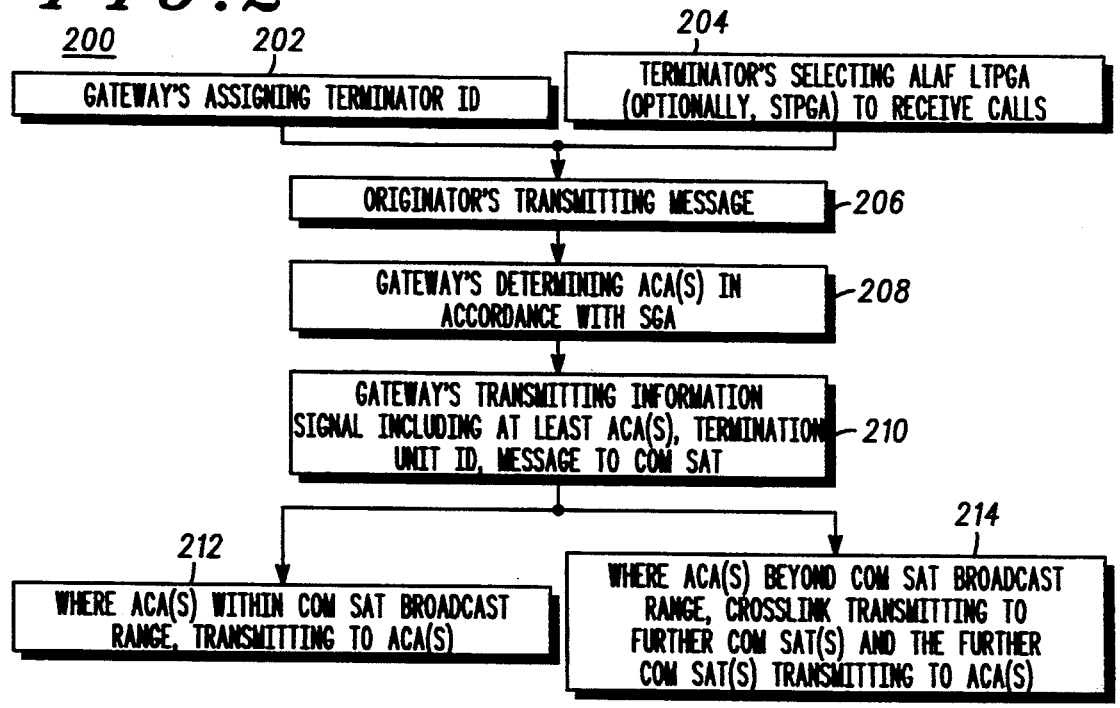
FIG. 2 is a flow chart for a first embodiment of a geographic area-selective low-earth satellite-based paging broadcast method in accordance with the present invention.

FIG. 2, numeral 200, is a flow chart for a first embodiment of a geographic area-selective low-earth satellite-based paging broadcast method in accordance with the present invention. Said invention provides a broadcast method for a system comprising at least a first termination unit for at least a first terminator, a plurality of addressable coverage areas (ACAs), and a plurality of communication satellites (COMSATs), for facilitating a user's utilizing an origination unit for transmitting a message to a preselected terminator unit utilizing COM SAT(s) to transmit a message to addressable coverage area(s) (ACA(s)). The method includes the following steps: (A) the gateway's assigning an identification code (ID) to the terminator and the terminator's selecting at least a LTPGA, and optionally, a STPGA, to receive messages sent by originators (202, 204), (B) the originator's transmitting a message (206), (C) the gateway's determining addressable coverage area(s) (ACA(s)) in accordance with the SGA(s) (208), (D) the gateway's transmitting information (210), including at least the ACA(s), the terminator ID, and message to a COM SAT having at least a communication relay transceiver and one of: (E1) where the ACA(s) are in a broadcast range beyond that of the COM SAT, the COM SAT transmitting the information to further COM SAT(s), each having at least a transceiver, in crosslink fashion to COM SAT(s) in a broadcast range containing the ACA(s), and the COM SAT(s) transmitting to the ACA(s) (214) and (E2) where the ACA(s) are in a broadcast range within that of the COM SAT, the COM SAT transmitting the information to the ACA(s) (212), such that the terminator unit receives the message.

Further details of the system used by the geographic area-selective low-earth satellite-based paging broadcast method, such as the SGA(s), are as described above.

Figure 3:
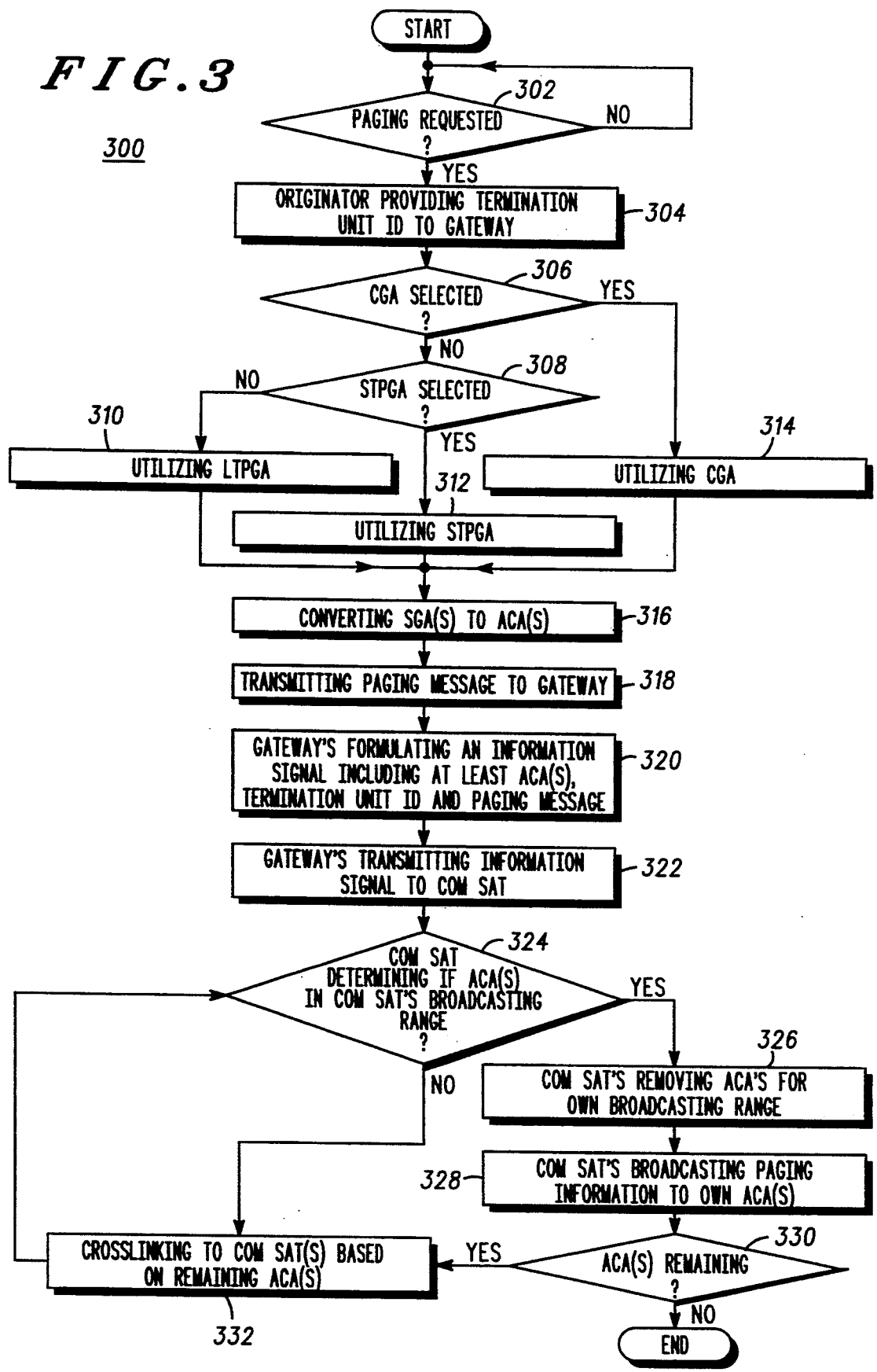
FIG. 3 is a flow chart of an embodiment of one embodiment of steps in the geographic area-selective low-earth satellite-based paging broadcast method in accordance with the present invention.

FIG. 3, numeral 300, is a flow chart of an embodiment of one embodiment of steps in the geographic area-selective low-earth satellite-based paging broadcast method in accordance with the present invention. Said paging broadcast method, as described above, utilizes at least a first origination unit for at least a first originator, a first gateway, a first termination unit, and a plurality of communication satellites (COMSATs), wherein a system implementing the method has a plurality of addressable coverage areas (ACAs) for facilitating a user's utilizing an origination unit for transmitting a message to a preselected termination unit utilizing addressable coverage areas (ACA(s)). Said paging broadcast method includes the following steps: (1) the gateway's determining whether transmission of a paging message has been requested, and, where transmission of a paging message is unrequested, recycling to determining whether transmission of a paging message has been requested (302); (2) where transmission of a paging message is requested, the originator providing a termination unit ID to the gateway for a selected terminator (304); the gateway's determining whether the originator has selected a customized preferred geographic area (CPGA) into which to broadcast the paging message (306); where the originator has selected CPGA(s), the gateway's utilizing the selected CPGA(s) (314); where a customized preferred geographic area (CPGA) for receiving the paging message is unselected, the gateway's determining whether a short term preferred geographic area (STPGA) has been selected (308); where a short term preferred geographic area is unselected, the gateway's utilizing the predetermined long term preferred geographic area (LTPGA) (310); where a short term preferred geographic area (STPGA) is selected, the gateway's utilizing the predetermined short term preferred geographic area (STPGA) (312); the gateway's converting the selected geographical area(s) (SGA(s)) to corresponding addressable coverage area(s) (target ACA(s)) (316); the originator's transmitting the paging message to the gateway (318); the gateway's formulating a signal including at least the ACA(s), the termination unit ID, and the paging message in an information signal (320); the gateway's transmitting the information signal to a COM SAT (322); the COM SAT determining whether the information signal includes ACA(s) in the COM SAT's broadcasting range (324); where the signal includes ACA(s) in the COM SAT's broadcasting range, the COM SAT's removing ACA(s) of its broadcasting range from the information signal (326) and transmitting a signal having the paging information to the target ACA(s), i.e., broadcasting paging information to own ACA(s))(328); where all of the ACA(s) in the signal are outside of the COM SAT's broadcasting range, crosslinking to COM SAT(s) based on remaining ACA(s) (332); after the COM SAT's broadcasting the paging information to its own ACA(s), the COM SAT's determining whether further target ACA(s) remain in the information signal (330); where further target ACA(s) remain, and only one crosslink is required, crosslinking the remaining signal and where more than one crosslinking COM SAT is required repacketizing and transmitting using crosslinks (Repacketizing is duplicating the paging information, dividing the ACA(s) into disjoint lists, and creating multiple crosslink packets for transmission) based on remaining target ACA(s) (332); where all target ACA(s) have been removed from the information signal, the steps of the method have been completed (330).

The information transmitted by the gateway to the communication satellite comprises a signal including at least an ID of the preselected termination unit, at least a first targeted addressable coverage area (ACA), and the selected paging message. In addition, a message number may also be included in the transmitted information.

Figure 4:
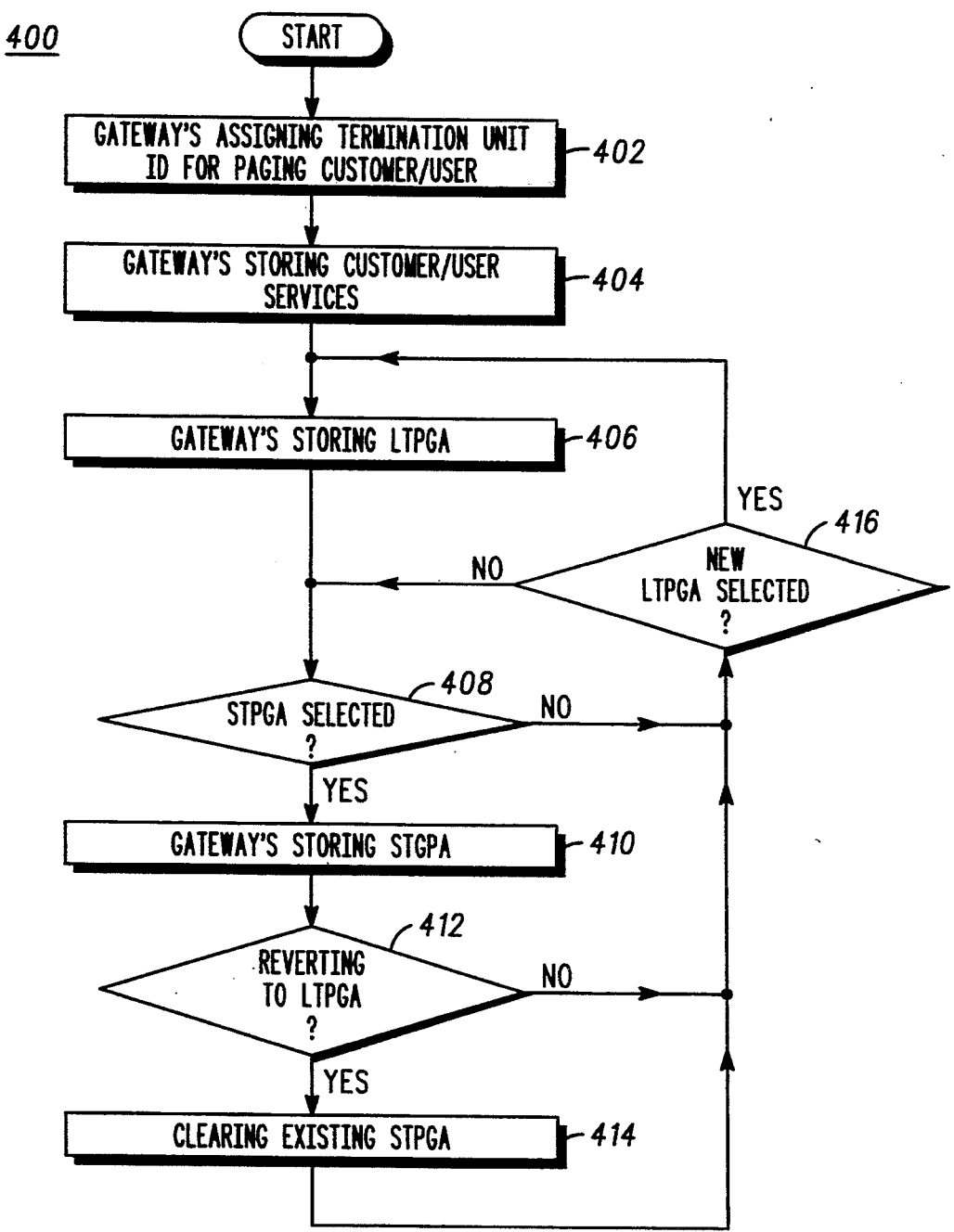
FIG. 4 is a flow chart of an embodiment of one embodiment of steps for a gateway's handling long-term preferred geographic areas and short-term preferred geographic areas in the geographic area-selective low-earth satellite-based paging broadcast method in accordance with the present invention.

FIG. 4, numeral 400, is a flow chart of an embodiment of one embodiment of steps for a gateway's handling long-term preferred geographic areas and short-term preferred geographic areas in the geographic area-selective low-earth satellite-based paging broadcast method in accordance with the present invention. In accordance with the embodiment of the present invention in correspondence with the page originator's steps set forth above, steps as viewed by the page terminator, typically comprise the steps of: (A) the gateway's assigning and storing an identification code (ID) for the termination unit (paging customer/user) (402); (B) the gateway's storing customer-selected services in a memory unit in correspondence with the termination unit ID (404); (C) the gateway's storing a customer-selected long term preferred geographic area (LTPGA) in a memory unit in correspondence with the termination unit ID (406); (D) determining whether the customer has selected a short term preferred geographic area (STPGA) (408) and where the short term preferred geographic area is unselected, proceeding to (H) determining whether an updated LTPGA has been selected (416); where an updated LTPGA has been selected, recycling to the gateway's storing the LTPGA (406); and where the LTPGA is unchanged, recycling to determining whether the customer has selected a short term preferred geographic area (STPGA) (408); (E) where the customer has selected a short term preferred geographic area, the gateway's storing the STPGA in a memory unit in correspondence with the termination unit ID (410); (F) determining whether to revert to the LTPGA (412) and, where no reversion to a LTPGA is selected, proceeding to (H) determining whether an updated LTPGA has been selected (416); where an updated LTPGA has been selected, recycling to the gateway's storing the LTPGA (406); and where the LTPGA is unchanged, recycling to determining whether the customer has selected a short term preferred geographic area (STPGA) (408);(G) where reversion to a LTPGA is selected, clearing the existing STPGA (414) and proceeding to (H), determining whether whether an updated LTPGA has been selected (416); where an updated LTPGA has been selected (416), recycling to the gateway's storing the LTPGA (406); and where the LTPGA is unchanged (416), recycling to determining whether the customer has selected a short term preferred geographic area (STPGA) (408). A single memory unit or multiple memory units may be used to store termination unit ID(s), customer selected service(s), LTPGA(s), and STPGA(s).

Also, the origination unit and the preselected termination unit may be selected to include features described in more detail above.

In addition, at least some of the gateways may be operably coupled to a public telephone network for further facilitating transmission of the origination unit paging information to the preselected termination unit.

Although certain embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A geographic area-selective low-earth satellite-based paging broadcast method for a system comprising at least:

an origination unit for at least a first originator,
a termination unit for at least a first terminator,
a gateway, and
a plurality of communication satellites having a plurality of addressable coverage areas, for facilitating the at least first originator's utilizing the originator unit for transmitting a paging message to at least one preselected termination unit addressable coverage area and at least one of the communication satellites of the plurality of communication satellites, said method comprising the steps of:

(A) assigning an identification code by the gateway to the termination unit and
selecting, by the termination unit, at least a long-term preferred geographical area and, optionally selecting, by the termination unit, a short-term preferred geographical area to receive the paging message sent by the at least first originator,
(B) transmitting the paging message by the originator, and optionally, a customized preferred geographical area,
(C) determining, by the gateway, at least one addressable coverage area in accordance with at least one selected geographic area,
(D) transmitting, by the gateway, information including said at least one addressable coverage area, said identification code, and the paging message to at least said one communication satellite of the plurality of communication satellites wherein said at least one communication satellite of the plurality of communication satellites has at least a transceiver and;
(E) one of:
(E1) where said at least one addressable coverage area is in a broadcast range beyond that of said at least one communication satellite of the plurality of communication satellites, transmitting, by said at least one communication satellite of the plurality of communication satellites, the information to at least one further communication satellite of the plurality of communication satellites, each having at least a transceiver, in crosslink fashion to at least one of other communication satellites of the plurality of communication satellites that are in a broadcast range containing said at least one addressable coverage area, and transmitting, by at least one of said other communication satellites of the plurality of communication satellites, the information to said at least one addressable coverage area,
(E2) where said at least one addressable coverage area is in a broadcast range within that of said at least one communication satellite of the plurality of communication satellites, transmitting, by said at least one communication satellite of the plurality of communication satellites, the information to said at least one addressable coverage area, wherein the paging message is transmitted to the termination unit;
(F) where selected, determining, by the gateway, whether said short-term preferred geographic area has been selected by the termination unit, and where said short-term preferred geographic area is selected, utilizing said short-term preferred geographic area in correspondence with said identification code, for use as selected by termination unit, and
simultaneously, determining, by the gateway, whether the paging message has been sent to the termination unit and repeating step F at predetermined intervals until the paging message is detected,
(G) where the paging message has been transmitted by the originator, providing, by the originator, to the gateway the identification code for the termination unit to receive the paging message,
(H) customizing selection of a geographic coverage area in correspondence with one of: the long-term preferred geographical area, the short-term preferred geographical area and the customized preferred geographical area where selected by the originator,
(I) determining, by the gateway: at least a first addressable coverage area in correspondence with the geographic area selected in step (H),
(J) transmitting, by the gateway, information including the at least one addressable coverage area, the identification code, and the paging message to said at least one communication satellite,
(K) determining by said at least one communication satellite, whether the information includes the at least one addressable coverage area within said communication satellite's broadcast range, and where beyond said range, crosslink transmitting to at least one further communication satellite of the plurality of satellites until at least one communication satellite within said range receives the information, (L) where said at least one communication satellite of the plurality of communication satellites within said range receives the information, transmitting, by said at least one communication satellite of the plurality of communication satellites within said range the information to the at least one addressable coverage area in said at least one communication satellite's broadcast range and removing said at least one addressable coverage area from the information, and, where further addressable coverage areas remain, transmitting the information with the further addressable coverage areas to another communication satellite of the plurality of satellites for crosslink transmission in accordance with steps K-L until the information has been transmitted to all addressable coverage areas selected by the originator, thus facilitating transmission of the information to the predetermined termination unit.

2. The method of claim 1 wherein for each selected geographical area, the selected geographical area is converted by the gateway to at least one addressable coverage area which encompasses the the selected geographical area.

3. The method of claim 1 wherein the information transmitted by the gateway to the communication satellite comprises a signal including at least:
  (A) said identification code of the termination unit,
  (B) said at least one addressable coverage area and
  (C) the paging message.

4. The method of claim 1 wherein the origination unit further comprises:
  (A) means for providing an indication that the paging message has been received by the termination unit,
  (B) means for transmitting said paging message, and, where selected, said at least one preselected termination unit addressable coverage area to the gateway.

5. The method of claim 1 wherein the termination unit further comprises means for providing one of:
  (A) means for indicating the paging message to the terminator,
  (B) a distinctive audio tone, visual display, and a vibrator, to advise the termination unit that it has a paging message.

6. A geographic area-selective low-earth satellite-based paging broadcast method for a system comprising at least:
  an origination unit for at least a first originator,
  a termination unit for at least a first terminator,
  a gateway, and
  a plurality of communication satellites having a plurality of addressable coverage areas, for facilitating an originator's utilizing an originator unit for transmitting a paging message to:
    at least a first preselected termination unit addressable coverage area and
    at least a first communication satellite,
  said method comprising the steps of:
  (A) determining, by the gateway, whether transmission of the paging message has been requested, and, where transmission of the paging message is unrequested, recycling to determining whether transmission of the paging message has been requested;
  (B) where transmission of the paging message is requested, providing, by the originator, a termination unit identification code to the gateway for a selected terminator;
  (C) determining, by the gateway, whether the originator has selected a customized preferred geographic area for transmitting the paging message;
  (D) where the originator has selected at least one customized preferred geographic area, utilizing, by the gateway, the selected at least one customized preferred geographic area;
  (E) where the at least one customized preferred geographic area into which to transmit the paging message is unselected, determining, by the gateway, whether a short term preferred geographic area has been selected;
  (F) where the short term preferred geographic area is unselected, utilizing, by the gateway, a predetermined long term preferred geographic area;
  (G) where the short term preferred geographic area is selected, utilizing, by the gateway, the predetermined short term preferred geographic area;
  (H) converting, by the gateway, where selected, the short-term preferred geographical area, and where the short-term preferred geographical area is unselected, converting the long-term preferred geographical area, to at least one corresponding target addressable coverage area;
  (I) transmitting, by the originator, the paging message to the gateway;
  (J) including, by the gateway, the at least one corresponding target addressable coverage area, the termination unit identification code, and the paging message in an information signal;
  (K) transmitting, by the gateway, the information signal to said at least one communication satellite of the plurality of communication satellites;
  (L) determining, by said at least one communication satellite of the plurality of communication satellites, whether the information signal includes said at least one corresponding addressable coverage area in said at least one communication satellite's broadcasting range;
  (M) removing, by said at least one communication satellite of the plurality of communication satellites, said at least one corresponding addressable coverage area of said broadcasting range from the information signal;
  (N) broadcasting, by said at least one communication satellite of the plurality of communication satellites, the paging information where said at least one corresponding target addressable coverage area is in said at least one communication satellite's broadcasting coverage area;
  (O) determining, by said at least one communication satellite of the plurality of communication satellites, whether further corresponding addressable coverage areas remain in the information signal;
  (P) where further corresponding addressable coverage areas remain in the information signal, crosslinking to at least one of other communication satellites of the plurality of communication satellites based on said further corresponding addressable coverage areas, then recycling to step (L) for determining by said at least one of the other communication satellites of the plurality of communication satellites whether said further corresponding addressable coverage areas remain in the information signal; and (Q) where all said further corresponding addressable coverage areas have been removed from the information signal, the paging message communication is complete.

7. The method of claim 6, further including the steps of:
   (A1) assigning and storing, by the gateway, an ID for the termination unit;
   (B1) storing, by the gateway, customer-selected services in a memory unit;
   (C1) storing by the gateway, a customer-selected long term preferred geographic area into the memory unit;
   (D1) determining whether the customer has selected a short term preferred geographic area and where the short term preferred geographic area is unselected, recycling to determining whether the customer has selected a short term preferred geographic area;
   (E1) where the customer has selected a short term preferred geographic area, storing, by the gateway, the short term preferred geographic area in the memory unit in correspondence with the termination unit identification code;
   (F1) determining whether to revert to the long term preferred geographic area, and, where no reversion to a long term preferred geographic area is selected, recycling to determining whether the customer has selected a short term preferred geographic area; and
   (G1) where reversion to a long term preferred geographic area is selected, clearing the existing short term preferred geographic area and recycling to determining whether the customer has selected a short term preferred geographic area.

8. The method of claim 6, further including the gateway's packetizing the information prior to transmitting the information signal to the communication satellite.

9. A geographic area-selective low-earth satellite-based paging broadcast system comprising at least:
   (A) an origination unit for at least a first originator, for transmitting a paging message, and, selectably, a customized preferred geographical area,
   (B) a gateway comprising:
   means for assigning an identification code to at least a first termination unit,
   means for determining at least one addressable coverage area in accordance with selected geographic areas and
   transmitting information including at least the at least one addressable coverage area the termination unit identification code, and the paging message to at least one communication satellite of a plurality of communication satellites having at least a transceiver,
   (C) a termination unit for at least a first terminator, for selecting at least a long-term preferred geographical area and, optionally selecting a short-term preferred geographical area to receive the paging message sent by the at least first originator, and
   (D) the plurality of communication satellites having a plurality of addressable coverage areas comprising:
   means for facilitating the first originator utilizing the originator unit,
   means for transmitting the paging message to at least one preselected termination unit addressable coverage area and the at least one communication satellite;
   (D1) where the at least one addressable coverage area is in a broadcast range beyond that of the at least one communication satellite of the plurality of communication satellites, transmitting, by said at least one communication satellite of the plurality of communication satellites, the information to other communication satellites of the plurality of communication satellites, each having at least a transceiver, in crosslink fashion to said other communication satellites of the plurality of communication satellites that are in a broadcast range containing said at least one addressable coverage area, and said other communication satellites of the plurality of communication satellites transmitting the information to said at least one addressable coverage area,
   (D2) where said at least one addressable coverage area is in a broadcast range within that of said other communication satellites of the plurality of communication satellites, transmitting, by said other communication satellites of the plurality of communication satellites, the information to said at least one addressable coverage area, wherein the paging message is transmitted to the termination unit;
   wherein, where selected, the gateway is further utilized for determining whether a short-term preferred geographic area has been selected by the termination unit, and where the short-term preferred geographic, area is selected, utilizing the short-term preferred geographic area in correspondence with the termination unit identification code, for use as selected by termination unit, and
   simultaneously, the gateway is utilized for determining whether the paging message has been sent to the termination unit and continuing said determination at predetermined intervals until the paging message is detected, and
   where the paging message has been transmitted by the originator, the originator is further utilized for providing to the gateway a target pager identification code for the termination unit to receive the paging message,
   where selected by the originator, the gateway is further utilized for customizing selection of a geographic coverage area in correspondence with one of: the long-term preferred geographic area, the short-term preferred geographic area and a customized preferred geographic area,
   the gateway is further utilized for determining the at least one addressable coverage area in correspondence with the, where selected, short-term preferred geographic area, and where the short-term preferred geographic area is unselected, in correspondence with the long-term preferred geographic area,
   the gateway is further utilized for transmitting the information including the at least one addressable coverage area, the pager identification code, and the paging message to the at least one communication satellite of the plurality of communication satellites,
   the at least one communication satellite of the plurality of communication satellites is further utilized for determining whether the information includes said at least one addressable coverage area within said at least one communication satellite's broadcast range, and where beyond said range, crosslink transmitting the information to at least one other communication satellite of the plurality of communication satellites until said at least one other communication satellite of the plurality of communication satellites within said range receives the information, and where said at least one other communication satellite of the plurality of communication satellites within said range receives the information, said at least one other communication satellite of the plurality of communication satellites is further utilized for transmitting the information to said at least one addressable coverage area in said at least one other communication satellite's broadcast range and removing said at least one addressable coverage area from the information, and, where at least one further addressable coverage area remains, transmitting the information with said at least one further addressable coverage area to at least one further communication satellite of the plurality of communication satellites for crosslink transmission until the information has been transmitted to all addressable coverage area selected by the originator, thus facilitating transmission of the information to the predetermined termination unit.

10. The system of claim 9 wherein for each selected geographical area, the selected geographical area is converted by the gateway to at least one addressable coverage area which encompasses the selected geographical area.

11. The system of claim 9 wherein the information transmitted by the gateway to the communication satellite comprises an information signal including at least:
 (A) the identification code of the preselected termination unit,
 (B) at least the one targeted addressable coverage area and
 (C) the paging message.

12. The system of claim 9 wherein the originator unit further comprises:
 (24A) means for providing an indication that the paging message has been received by the termination unit,
 (24B) means for transmitting paging information, and, where selected, the customized preferred geographic area selection to the gateway.

13. The system of claim 9 wherein the preselected termination unit further comprises means for providing one of:
 (25A) means for indicating the paging message to the terminator,
 (25B) a distinctive audio tone, visual display, and a vibrator, to advise the termination unit that it has a paging message.

14. A geographic area-selective low-earth satellite-based paging broadcast system comprising at least:
 (A) an origination unit for at least a first originator, for, where transmission of a paging message is requested, providing a termination unit ID to a gateway for a selected terminator and transmitting the paging message to the gateway,
 (B) a termination unit for at least a first terminator,
 (C) a gateway comprising:
 means for determining whether transmission of the paging message has been requested, and, where transmission of the paging message is unrequested, recycling to determining whether transmission of the paging message has been requested,
 means for determining whether the originator has selected a customized preferred geographic area for transmitting the paging message, and, where the originator has selected said customized preferred geographic area utilizing said customized preferred geographic area,
 where said customized preferred geographic area into which to transmit the paging message is unselected, determining whether a short term preferred geographic area has been selected,
 where a short term preferred geographic area is unselected, utilizing a predetermined long term preferred geographic area,
 where a short term preferred geographic area is selected, utilizing the predetermined short term preferred geographic area,
 converting, where the short-term preferred geographic area is selected, the short-term preferred geographic area, and where the short-term preferred geographic area is unselected, converting the long-term preferred geographic area, to at least one corresponding addressable coverage area,
 including at least the at least one corresponding addressable coverage area, the termination unit identification code, and the paging message in an information signal,
 transmitting the information signal to at least one communication satellite of a plurality of communication satellites,
 (D) the plurality of communication satellites comprising a plurality of addressable coverage areas, and means for facilitating an originator's utilizing an originator unit for transmitting the paging message to at least one corresponding addressable coverage area of the termination unit and at least one communication satellite of the plurality of communication satellites wherein said at least one communication satellite comprises:
 means for determining whether the information signal includes said at least one corresponding addressable coverage area in said at least one communication satellite's broadcasting range,
 means for removing said at least one corresponding addressable coverage area of its broadcasting range from the information signal,
 means for broadcasting the paging information where said at least one corresponding addressable coverage area is in said at least one communication satellite's broadcasting coverage area,
 means for determining whether further target corresponding addressable coverage area remain in the information signal,
 where said further target corresponding addressable coverage area remain in the information signal, crosslinking to at least one further communication satellite of the plurality of communication satellites based on said further target corresponding addressable coverage area, then recycling to said at least one further communication satellite's determining whether said further target corresponding addressable coverage area remain in the information signal, and where all said further target corresponding addressable coverage area have been removed from the information signal, the paging message communication is complete.

15. The system of claim 14, wherein the gateway is further utilized for:

assigning and storing an identification code for the termination unit, storing customer-selected services in a memory unit, storing a customer-selected long term preferred geographic area into the memory unit, determining whether the customer has selected a short term preferred geographic area and where the shod term preferred geographic area is unselected, recycling to determining whether the customer has selected a short term preferred geographic area; and where the customer has selected a short term preferred geographic area, storing the short term preferred geographic area in the memory unit in correspondence with the termination unit identification code, determining whether to revert to the one term preferred geographic area and, where no reversion to a long term preferred geographic is selected, recycling to determining whether the customer has selected a short term preferred geographic area; and where reversion to a long term preferred geographic area is selected, clearing the existing short term preferred geographic area and recycling to determining whether the customer has selected a short term preferred geographic area.

16. The system of claim 14, wherein the gateway is further utilized for packetizing the information prior to transmitting the information signal to the communication satellite.

* * * * *

UNITED STATES PATENT AND TRADEMARK OFFICE
CERTIFICATE OF CORRECTION

PATENT NO. : 5,396,643
DATED : March 7, 1995
INVENTOR(S) : Fenzer, et. al.

It is certified that error appears in the above-indentified patent and that said Letters Patent is hereby corrected as shown below:

| | |
|---|---|
| In column 1, line 24: | please replace "pageris" with --pager is--. |
| In column 2, line 28: | please insert a comma after the phrase "(user is terminator)". |
| In column 2, line 28: | please replace "and" with --an--. |
| In column 2, line 29: | please insert --and-- before the phrase "an information device". |
| In column 9, line 2: | please replace "a LTPGA" with --an LTPGA--. |
| In column 10, line 55: | please replace the colon with a comma. |
| In column 11, line 8: | please insert a comma after "range". |
| In column 11, line 24: | delete the second instance of the word "the". |
| In column 11, line 30: | insert a comma after the word "area". |
| In column 15, line 25: | please replace "area" with --areas--. |
| In column 15, line 43: | please replace "24A" with --12A--. |
| In column 15, line 46: | please replace "24B" with --12B--. |
| In column 15, line 52: | please replace "25A" with --13A--. |
| In column 15, line 54: | please replace "25B" with --13B--. |
| In column 17, line 11: | please replace "shod" with --short--. |
| In column 18, line 3: | please replace "one" with --long--. |

Signed and Sealed this

Twelfth Day of September, 1995

Attest:

BRUCE LEHMAN

Attesting Officer  Commissioner of Patents and Trademarks